(12) United States Patent
Silvera et al.

(10) Patent No.: US 8,104,030 B2
(45) Date of Patent: Jan. 24, 2012

(54) MECHANISM TO RESTRICT PARALLELIZATION OF LOOPS

(75) Inventors: Raul Esteban Silvera, Woodbridge (CA); Priya Unnikrishnan, Toronto (CA); Guansong Zhang, North York (CA)

(73) Assignee: International Business Machines Corporation, Armonk, NY (US)

( * ) Notice: Subject to any disclaimer, the term of this patent is extended or adjusted under 35 U.S.C. 154(b) by 1361 days.

(21) Appl. No.: 11/314,456

(22) Filed: Dec. 21, 2005

(65) Prior Publication Data

US 2007/0169057 A1 Jul. 19, 2007

(51) Int. Cl.
*G06F 9/44* (2006.01)
*G06F 9/45* (2006.01)

(52) U.S. Cl. ........ 717/160; 717/127; 717/149; 717/150; 717/151; 717/153; 717/154; 717/159; 717/161

(58) Field of Classification Search ................... 717/127, 717/149, 150, 151, 153, 154, 160, 161
See application file for complete search history.

(56) References Cited

U.S. PATENT DOCUMENTS

| | | | | |
|---|---|---|---|---|
| 5,050,070 A | * | 9/1991 | Chastain et al. | 712/203 |
| 5,179,702 A | * | 1/1993 | Spix et al. | 718/102 |
| 5,230,053 A | * | 7/1993 | Zaiki | 717/150 |
| 5,491,823 A | * | 2/1996 | Ruttenberg | 717/161 |
| 6,016,397 A | * | 1/2000 | Ogasawara et al. | 717/160 |
| 6,341,371 B1 | * | 1/2002 | Tandri | 717/158 |
| 6,539,541 B1 | * | 3/2003 | Geva | 717/150 |
| 6,708,331 B1 | * | 3/2004 | Schwartz | 717/160 |
| 2006/0010432 A1 | * | 1/2006 | Iwashita | 717/136 |

OTHER PUBLICATIONS

IBM Technical Disclosure Bulletin, "Speculation in Parallel Systems," Sep. 1993, IBM, vol. 36 Issue 9A, pp. 371-376.*
Aiken et al., "Optimal Loop Parallelization," Jun. 1988, ACM, Proceedings of the ACM SIGPLAN 1998 conference on Programming Language design and Implemention, pp. 308-317.*
Markatos et al. Using Processor Affinity in Loop Scheduling on Shared-Memory Multiprocessors. [online] (Apr. 1994). IEEE, pp. 379-400. Retrieved From the Internet <http://ieeexplore.ieee.org/xpls/abs_all.jsp?arnumber=273046>.*
Krishnan et al. A Chip-Multiprocessor Architecture with Speculative Multithreading. [online] (Sep. 1999). IEEE, pp. 866-880. Retrieved From the Internet <http://ieeexplore.ieee.org/xpls/abs_all.jsp?arnumber=795218&tag=1>.*

(Continued)

*Primary Examiner* — Emerson Puente
*Assistant Examiner* — Jonathan R Labud
(74) *Attorney, Agent, or Firm* — Yee & Associates, P.C.; Ayla A. Lari

(57) ABSTRACT

A computer implemented method, computer usable program code, and a system for parallelizing a loop. A parameter that will be used to limit parallelization of the loop is identified to limit parallelization of the loop. The parameter specifies a minimum number of loop iterations that a thread should execute. The parameter can be adjusted based on a parallel performance factor. A parallel performance factor is a factor that influences the performance of parallel code. A number of threads from a plurality of threads is selected for processing iterations of the loop based on the parameter. The number of threads is selected prior to execution of the first iteration of the loop.

20 Claims, 5 Drawing Sheets

OTHER PUBLICATIONS

Lim et al. Maximizing Parallelism and Minimizing Synchronization with Affine Transforms. [online] (1997). ACM, pp. 1-14. Retrieved From the Internet <http://dl.acm.org/citation.cfm?id=263719>.*

Olukotun et al. Improving the performance of speculatively parallel applications on the Hydra CMP. [online] (1999). ACM, pp. 21-30. Retrieved From the Internet <http://dl.acm.org/citation.cfm?id=305155>.*

Chen et al. The Jrpm System for Dynamically Parallelizing Java Programs. [online] (May 2003). ACM. pp. 1-12. Retrieved From the Internet <http://dl.acm.org/citation.cfm?id=859618.859668>.*

Hall, et al., "Adaptive Parallelism in Compiler-Parallelized Code", Concurrency: Practice and Experience, vol. 10, No. 14, 1998, pp. 1235-1250.

Zhang, et al. "Experiments with Auto-Parallelizing SPEC2000FP Benchmarks", *LCPC '04: The 17th International Workshop on Languages and Compilers for Parallel Computing*, 2004, pp. 1-15.

Hall, "Combining Interprocedural Compile-Time and Run-Time Parallelization", Information Science Institute, 1999, pp. 1-2. http://www.isi.edu/asd/compiler/project.html, retrieved Dec. 15, 2005.

* cited by examiner

FIG. 4

```
       ⎧ int main(){
       ⎪     ....
       ⎪     for(int i=0; i<n; i++){
  410 ⎨          a[i] = const;
       ⎪          ....
       ⎪     }
       ⎩ }
```

```
       ⎧ Subroutine void main@OL@1 (unsigned @LB, unsigned @UB){
       ⎪     @CIV1 = 0;
       ⎪     do{
       ⎪         a[]0[(long) @LB + @CIV1] = const;
  420 ⎨         ....
       ⎪         @CIV1 = @CIV1 + 1;
       ⎪     }while ((unsigned) @CIV1 < (@UB - @LB));
       ⎪     return;
       ⎩ }
```

```
       ⎧ long main(){
       ⎪     @_xlsmpEntry0 = _xlsmpInitializeRTE();
       ⎪     if (n>0) {
       ⎪   434 ⎯ if (loop_cost>threshold) {
       ⎪           432 ⎯ iterations per thread parameter = fn(loop_cost,...)
       ⎪           436 ⎯ _xlsmpParallelDoSetup_TPO(2208,&main@OL@1,0,
       ⎪                     n,5,0,@_xlsmpEntry0,0,
  430 ⎨                     0,0,0,0,iterations per thread parameter)
       ⎪        ⎧   }
       ⎪        ⎪   else{
       ⎪        ⎪       main@OL@1(0,0,(unsigned) n, o)  ⎯ 442
       ⎪   440 ⎨       }
       ⎪        ⎪   }
       ⎪        ⎩   return main;
       ⎩ }
```

510 {
begin
    ThreadsUsed = TotalIterations/iterations per thread parameter

520 {
    if (ThreadsUsed > ThreadsAvailable) then
        ThreadsUsed = ThreadsAvailable
end

_US 8,104,030 B2_

MECHANISM TO RESTRICT PARALLELIZATION OF LOOPS

BACKGROUND OF THE INVENTION

1. Field of the Invention

The present invention relates generally to an improved data processing system and in particular, to a method, system, and computer usable program code for processing program code. Still more particularly, the present invention relates to a computer implemented method, computer usable program code, and a system for parallelizing program code.

2. Description of the Related Art

Parallelization is the process by which a compiler automatically identifies and translates serial program code into equivalent parallel code for parallel processing. Parallel processing permits simultaneous processing of a portion of program code over multiple threads on one or more processors. Parallel processing can potentially enable a significant increase in execution speed of a program or application. However, in practice, not all program code can benefit from parallelization.

The challenge for automatic parallelizing compilers is to identify sections of code that can benefit from parallelization. When determining whether or not to parallelize a particular loop, the compiler assesses whether parallelization of the loop is both safe and cost-justified.

Most compilers use an all-or-none strategy to parallelize a loop. Based on a cost analysis, small loops are executed sequentially by a single thread on a single processor and large loops are selected for parallelization and executed over the maximum number of available processors.

However, using all available processors to execute parallel code can result in serious performance degradations and scalability problems. For example, when a small loop is parallelized over a large number of processors, the overhead costs of creating and setting up threads to run on processors for processing the parallel code can outweigh the benefit of parallelization.

Some research compilers have attempted to address this problem by adjusting the number of processors utilized to execute parallel code during run-time. Parallel code is initially processed by all available processors. During program execution, the number of processors used to process parallelized code is adjusted based on observed performance during code execution. However, performance degradation is a problem due to the initial use of all the available processors for parallelization. Moreover, this method also introduces additional overhead costs due to the feedback mechanism that operates during execution of the code.

SUMMARY OF THE INVENTION

The aspects of the present invention provide a computer implemented method, computer usable program code, and a system for parallelizing a loop. A parameter that will be used to limit parallelization of the loop is identified. The parameter specifies a minimum number of loop iterations that a thread should execute. The parameter can be adjusted based on a parallel performance factor. A parallel performance factor is a factor that influences the performance of parallel code. A number of threads from a plurality of threads is selected for processing iterations of the loop based on the parameter. The number of threads is initially selected prior to execution of the first iteration of the loop.

BRIEF DESCRIPTION OF THE DRAWINGS

The novel features believed characteristic of the invention are set forth in the appended claims. The invention itself, however, as well as a preferred mode of use, will best be understood by reference to the following detailed description of an illustrative embodiment when read in conjunction with the accompanying drawings, wherein:

FIG. 4 is an exemplary illustration of intermediate code generated by a compiler for a loop transformed into an outlined routine in accordance with an exemplary embodiment of the present invention;

DETAILED DESCRIPTION OF THE PREFERRED EMBODIMENT

Figure 1:
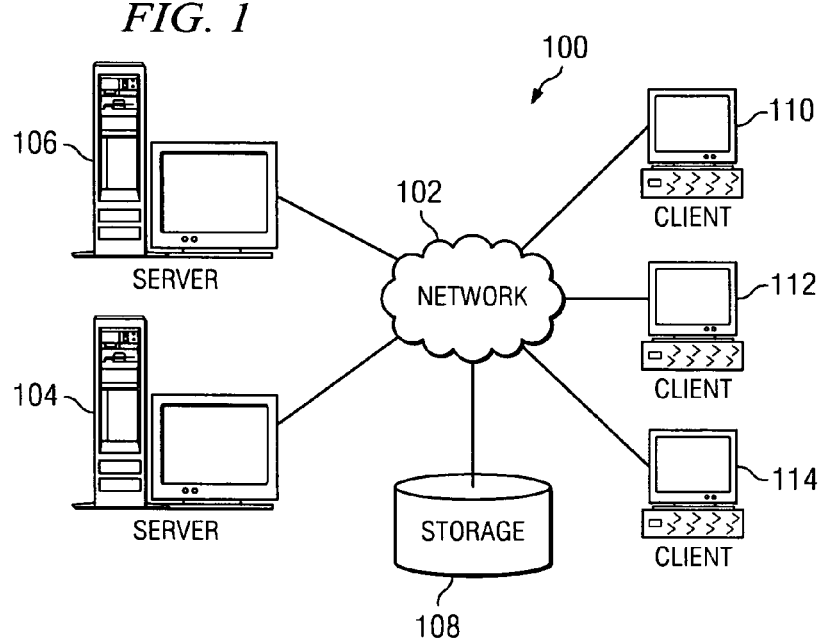
FIG. 1 is a pictorial representation of an exemplary data processing system in which the aspects of the present invention may be implemented.
Figure 2:
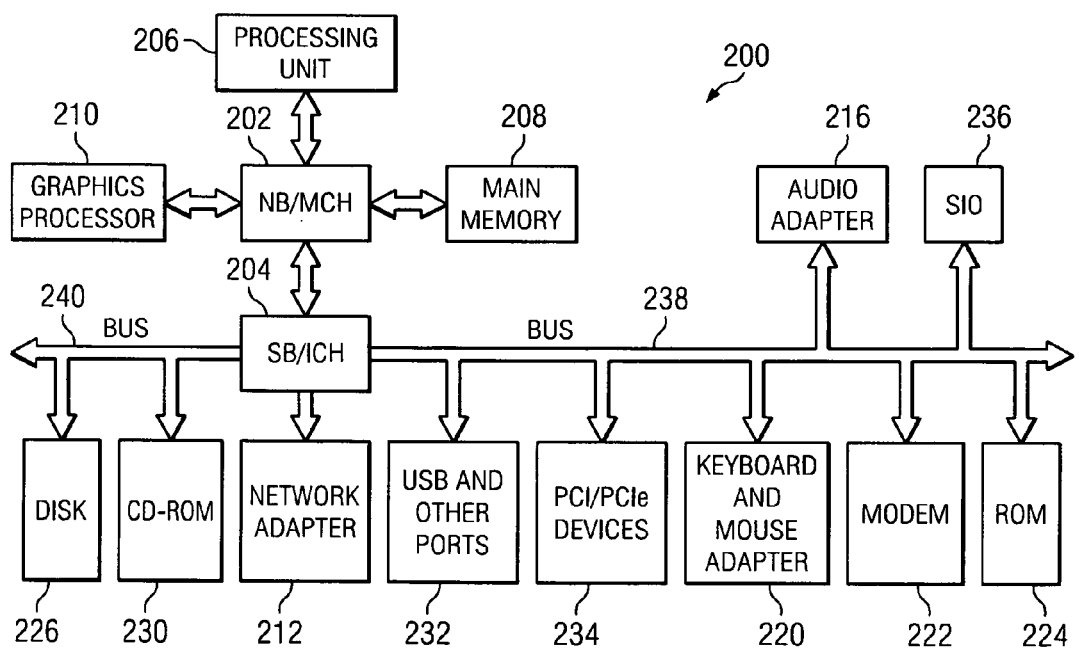
FIG. 2 is a block diagram of an exemplary data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers coupled together within network data processing system 100. Network 102 may include couplings, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are coupled to NB/MCH 202. Graphics processor 210 may be coupled to NB/MCH 202 through an accelerated graphics port (AGP).

In the depicted example, local area network (LAN) adapter 212 is coupled to SB/ICH 204. Audio adapter 216, keyboard and mouse adapter 220, modem 222, read only memory (ROM) 224, universal serial bus (USB) ports and other communication ports 232, and PCI/PCIe devices 234 are coupled to SB/ICH 204 through bus 238 and hard disk drive (HDD) 226 and CD-ROM drive 230 are coupled to SB/ICH 104 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

As noted above, HDD 226 and CD-ROM drive 230 are coupled to SB/ICH 204 through bus 240. HDD 226 and CD-ROM drive 230 may use, for example, an integrated drive electronics (IDE) or serial advanced technology attachment (SATA) interface. Super I/O (SIO) device 236 may be coupled to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java® programming system, may run in conjunction with the operating system and provides calls to the operating system from Java® programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

A program code written in a high level language, such as C programming language, must be translated into machine code before the program code can be executed by a processor. A compiler translates high level language source code composed by a programmer into machine readable code for execution by a processor.

During the compilation process, a compiler can automatically parallelize a portion of code into multithreaded object code for execution over multiple threads in a multiprocessor system.

A thread is a portion of program code executing independently. Threads bind to processors, such as processing unit 206 in FIG. 2. In most cases, threads have a one-to-one binding with physical processors. In such cases, a single thread binds to a single processor. Hence the terms "thread" and "processor" can generally be used interchangeably in such instances. However, in simultaneous multithreading (SMT) and hyper-threading (HT) machines, several threads can bind to a single processor. In such cases, an explicit distinction is made between threads and processors.

The term "thread", as used herein, is intended to encompass a single thread binding to a processor in a one-to-one binding, a thread within a plurality of threads on a single processor, and a thread on a processor coupled to a plurality of processors in a network, such as network 102 in FIG. 2. The term "processor" is intended to include a processor having a single thread, as well as a processor having multiple threads.

A multiprocessor system may take the form of a single computer comprising multiple processors capable of simultaneous execution of code by each processor. A multiprocessor system may also take the form of a computer comprising one or more processor(s) wherein that computer is coupled by a network to one or more other computer(s) having one or more other processor(s) for processing code, such as network 102 in FIG. 2.

Parallelizing code to execute in a multiprocessor system can potentially increase execution speed for the code. However, not all code can benefit from parallelization. An automatic parallelizing compiler identifies portions of program code that can be safely and profitably parallelized.

A compiler identifies a portion of program code, such as a loop, that can be safely parallelized by determining if any negative consequences could result from parallel processing of the code. For example, a program code containing a loop may not be divisible in a manner that would permit multiple threads to execute the various iterations of the loop without computing inaccurate results due to dependencies between statements or iterations of the loop.

A compiler determines whether a portion of code containing a loop can be profitably parallelized based on a loop cost. A loop cost is the approximate execution time for processing the loop. Generally, the loop cost is calculated by the compiler based on an estimated number of iterations for the loop and an estimated execution time for a single iteration of the loop. The iteration count and execution time for the loop can be estimated based on statistical values available to the compiler at compile-time.

Selection of a loop for parallelization based on a cost analysis can be important to loop execution performance. If a loop iteration count is too low or a loop body size is too small, the overhead costs of setting up and synchronizing parallel processing of the loop can outweigh any gain in execution performance from parallelization.

When a loop is selected for parallelization, the parallelized loop is typically executed over multiple threads in all available processors. However, using a large number of processors to execute a parallelized loop of small size can result in serious performance degradations and scalability problems. Moreover, simply selecting loops for parallelization based on whether the loop is large enough and can be safely parallelized does not always guarantee good parallel performance.

Parallel performance is dependent on the loop iteration count for the loop, the amount of work available in the loop, and cache access patterns, as well as the number of threads used to execute the loop.

The number of threads used to execute a parallelized loop should be proportional to the cost of the loop. The loop cost is a particularly significant factor in parallelizing loops of a smaller loop size. The loop size includes both the number of iterations for the loop as well as the loop body size. A loop body consists of the statements that are repeated in the loop.

The aspects of the present invention provide an improved method, computer usable program code, and system for restricting the number of threads used for parallelizing a loop based on a loop cost. A compiler calculates a parameter as a function of loop cost. This parameter specifies a minimum number of loop iterations that a thread should execute in order to maintain profitability of parallelizing the loop. The value for the parameter is used to limit or restrict parallelization of a loop over a selected number of threads.

In accordance with the aspects of the present invention, the parameter can be determined during compile-time based on known compile-time values in most cases. However, in cases where the values are not known at compile-time, the parameter is computed at run-time.

The compiler determines a number of threads from a plurality of threads for processing iterations of the loop based on the value of the parameter. The number of threads may be determined by dividing the actual number of iterations for the loop by the value of the parameter.

Figure 3:
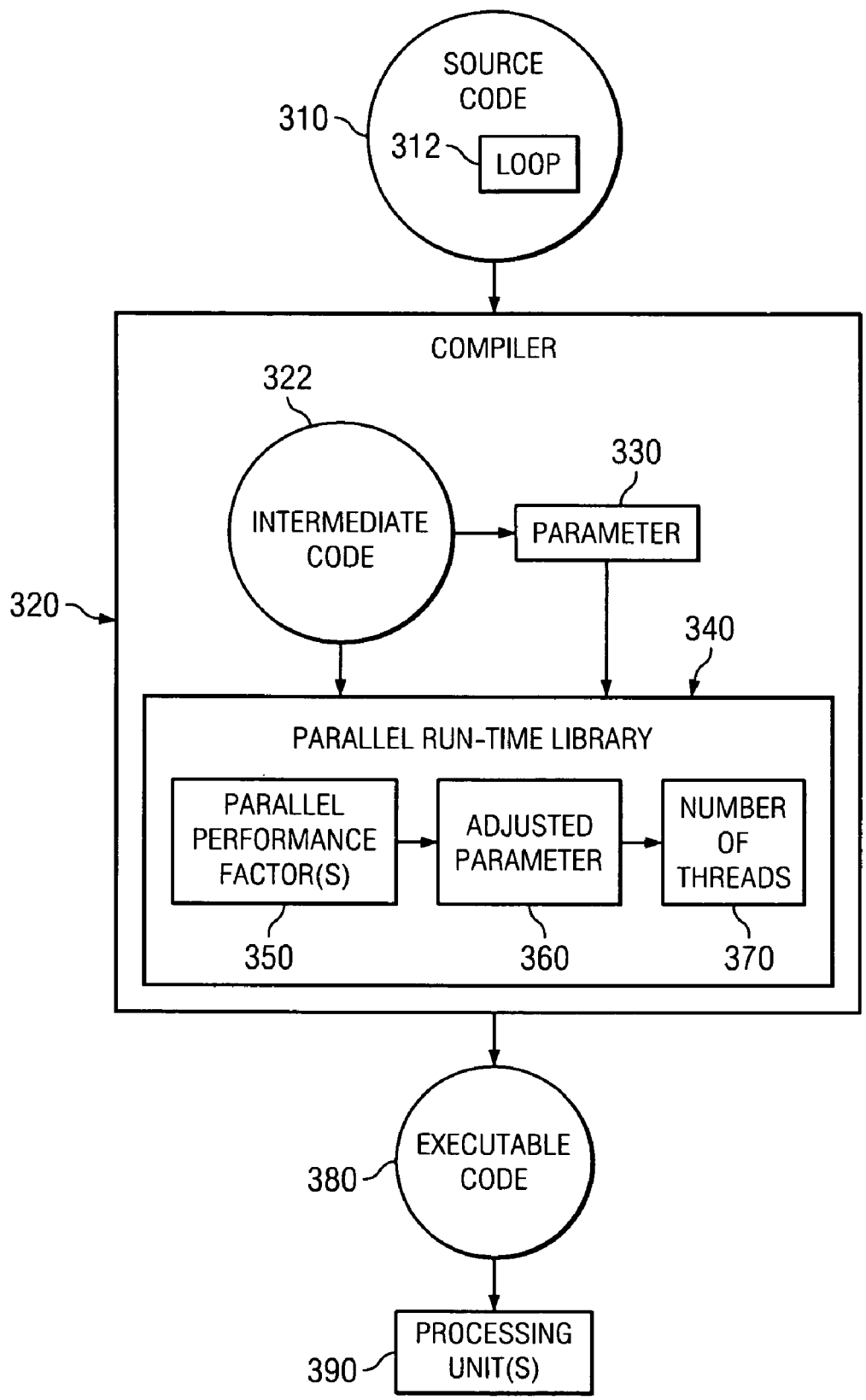
FIG. 3 is an exemplary block diagram illustrating a compiler parallelizing a loop in accordance with an exemplary embodiment of the present invention.

FIG. 3 depicts an exemplary block diagram illustrating a compiler and other components used in parallelizing a loop in accordance with an exemplary embodiment of the present invention. Source code 310, such as a high level language code, includes loop 312. Source code 310 is provided to a compiler, such as compiler 320. Compiler 320 transforms source code 310 written in a high level language into machine code capable of being executed by a computer processing unit. A high level language includes any known high level language utilized by programmers, such as, for example, C programming language, C++ programming language, and Java® programming language.

Compiler 320 selects a portion of code, such as loop 312, which can safely and cost-effectively be parallelized for execution in a multiprocessor system. The selection of a loop for parallelization can be important to parallel performance. Overhead costs of setting up parallel processing can completely offset any gain from parallelization if the loop is too small.

Once a loop has been determined to be safe for parallelization, a determination is made as to whether parallelization of the loop is cost-justified based on a loop cost. A loop cost for the particular loop can be calculated by the compiler based on an approximate execution time for a single iteration of the loop body multiplied by the number of iterations for the loop. In other words, the loop cost can be determined based on an estimated size of the loop body and the number of iterations through which the loop will execute, according to the following illustrative equation:

$$LoopCost = (IterationCount * ExecutionTimeOfLoopBody).$$

Once a portion of code has been selected by the compiler for parallelization, the compiler generates intermediate code 322.

Compiler 320 generates intermediate code 322 for loop 312 in order to transform source code 310 containing loop 312 into an outlined routine for parallelizing loop 312. Intermediate code 322 includes a function to calculate a parameter, such as parameter 330, which specifies the minimum number of iterations to be executed by each thread. This parameter is passed to a parallel run-time library, such as parallel run-time library 340. The parallel run-time library selects the number of threads from a plurality of available threads for cost-effectively processing the parallelized loop.

If all available threads are utilized for processing a parallelized loop, inefficiency can result due to utilization of more threads than can effectively be utilized for processing the parallel code. Therefore, compiler 320 generates intermediate code 322 to calculate parameter 330 which is used to restrict parallelization of the loop over a selected number of threads from the plurality of available threads to process the parallelized loop. In this manner, performance degradations that might otherwise occur due to utilization of the maximum number of threads can be avoided.

The value of the parameter can be calculated as a function of loop cost based on statistically available information known at compile-time most of the time. In accordance with another embodiment of the invention, if information needed to calculate the parameter value is not available at compile-time, the parameter value is computed at run-time. In accordance with an embodiment of the present invention, a value for the parameter is determined before the first iteration of the loop is executed.

The parameter is independent from the iteration count of a particular instance of the loop. In accordance with an embodiment of the present invention, the parameter is determined according to the following statement:

parameter_value=fn(loop_cost, ... ).

In accordance with the aspects of the present invention, the parameter can be calculated statistically based on known compile-time values in most cases.

In accordance with an embodiment of the present invention, the parameter can be adjusted at run-time based on one or more parallel performance factors. A parallel performance factor is a factor that influences the performance of parallel code during run-time when the program operates.

Parallel performance factors 350 may be calculated or determined by the compiler based on information gathered and analyzed by the compiler. Examples of parallel performance factors include cache access patterns, run-time profiling, and user defined environment factors.

A cache access parallel performance factor provides information regarding the cache access patterns for a particular loop. For example, if two threads processing a loop access the same cache line containing an array of four elements, and each thread only performs two iterations, then the second thread will have to wait for the first thread to access array elements 1 and 2 before the second thread can utilize array elements 3 and 4 in the cache line. This false sharing between threads can lead to performance degradations.

The compiler 320 can analyze memory access patterns in loop 312 to determine cache access pattern information for loop 312. Utilizing the cache access pattern information, parameter 330 can be adjusted to ensure that each thread executes iterations that access values stored in different cache lines. In the example above, if the parameter is adjusted to a minimum of four iterations per thread, each thread will access a full cache line. Each thread will execute iterations of the loop that access values located in separate cache lines, thus avoiding any performance degradations due to false sharing between the threads.

Run-time profiling information can be used as a parallel performance factor. It provides information regarding execution time for a particular instance of a loop. The parallel run-time library performs monitoring of parallel execution time for a loop and stores a history of execution times for parallel processing. A run-time parallel performance factor indicates an estimated execution time for a loop based on profiling information collected by the parallel run-time library. The parallel run-time library can adjust the parameter based on the run-time parallel performance factors for a particular instance of a loop.

A user defined environment factor is a user specified threshold or limitation restricting one or more factors utilized to determine the number of threads for parallelizing a loop. In one embodiment of the present invention, a user defined environment factor will override or replace a value or variable utilized by the parallel run-time 340 to select a number of threads for parallelizing the loop.

For example, the user can specify that the application should only utilize four threads out of ten available threads for processing iterations of the loop. In such a case, if the parallel run-time library selects a number of threads for parallelizing the loop that is greater than four threads, the number of threads to use to parallelize the loop will default to the number of threads specified in the user defined environment variable.

An illustrative example of a user defined environment variable includes:

export OMP_NUM_THREADS=2

This user defined environment variable specifies that the application should only utilize two threads to execute the parallelized code.

In another embodiment of the present invention, a user can specify the value of parameter 330 as a user defined value. In such a case, the user defined parameter would take precedence over any parameter or adjusted parameter determined by the compiler. Parallel run-time library 340 would utilize the user defined value for parameter 330 to determine the number of threads 370 to use for processing the iterations of the loop rather than the compiler generated value for parameter 330 or adjusted parameter 360. In other words, the parameter value will be ignored as the user defined value for the parameter specifies the minimum number of threads to use for parallelizing the loop.

Parallel run-time library 340 selects a number of threads 370 from a plurality of available threads to be used to process the parallelized loop. The number of threads 370 to be used is determined based on adjusted parameter 360. The parameter 330 is adjusted to form an adjusted parameter 360 prior to execution of a first iteration of loop 312. If an adjusted parameter is not available, the number of threads to be used is determined based on the unadjusted value of parameter 330. The loop is parallelized over selected number of threads 370. In accordance with an embodiment of the present invention, the number of threads is selected before execution of the first iteration of the loop.

Intermediate code 322 generated by compiler 320 calls a parallel run-time routine to parallelize loop 312 over the selected number of threads 370 to form executable parallelized code in these examples. The executable parallelized code takes the form of executable code 380. Executable code 380 is passed to one or more processing units for parallel processing.

In the illustrative example shown in FIG. 3, source code 310 is a high level language code including a loop 312. Source code 310 is received by compiler 320 for parallelization. Compiler 320 generates intermediate code 322. Intermediate code 322 executes a function to determine a value for parameter 330 based on a function of loop cost. Parameter 330 is passed by compiler 320 to parallel run-time library 340. Parallel run-time library 340 adjusts parameter 330 based on one or more parallel performance factor(s) 350 to form adjusted parameter 360.

The compiler 320 calls a parallel run-time routine which utilizes the value of adjusted parameter 360 to determine a selected number of threads 370 from the plurality of available threads for processing the parallelized loop.

Compiler 320 compiles source code 310 to form parallelized executable code 380. Compiler 320 passes executable code 380 to processing units 390 for processing in parallel.

As discussed briefly above, the selected number of threads for parallelizing a loop is calculated based on a value for a parameter. The parameter is calculated as a function of loop cost. A compiler, such as compiler 320, can determine a loop cost for a loop using a number of different ways in these examples. In accordance with one illustrative embodiment of the present invention, the loop cost for a particular instance of a loop is determined based on known compile-time values for estimating a loop body size and loop iteration count.

In accordance with another illustrative embodiment of the present invention, the loop cost can also be determined utilizing values known at run-time. However, the run-time computation can result in additional overhead if loop cost is determined during execution of the loop. In these examples, run-time cost computations are kept as lightweight as possible because of the overhead incurred during run-time. The embodiments of the present invention may also be performed using any other methods for calculating a loop cost that are known in the prior art.

In accordance with another embodiment of the present invention, if no parallel performance factors are available to adjust the value of the parameter, parallel run-time library 340 will determine a selected number of threads 370 for processing iterations of loop 312 based on the unadjusted value for the parameter, such as the value for parameter 330.

In another illustrative embodiment, after execution of the loop has begun, the parameter can also be adjusted during execution of the loop based on information gathered regarding processing efficiency for the loop during run-time. The parameter is adjusted during run-time to create a run-time adjusted parameter. The run-time adjusted parameter is passed to the parallel run-time routine. The parallel run-time routine utilizes the run-time adjusted parameter to adjust the selected number of threads for processing the loop iterations to form an adjusted number of threads. The run-time adjusted number of threads is passed to the run-time environment where the number of threads processing the iterations of the loop can be dynamically adjusted in accordance with the run-time adjusted number of threads to further improve processing efficiency for the loop.

FIG. 4 is an exemplary illustration of intermediate code generated by a compiler for a loop transformed into an outlined routine in accordance with an exemplary embodiment of the present invention. In this example, code 410-440 is an example of intermediate code 362 322 in FIG. 3.

Code 410 is high level language source code containing a FOR loop. The compiler transforms the loop shown in code 410 into an outlined routine, as shown in code 420. The compiler transforms the loop into a separate nested function. The nested function is parameterized so that it can be invoked for different ranges in the iteration space. The nested function can access the local variables from the original function.

Code 430 is a call to the parallel run-time routine. A parameter for the loop shown in code 410 is determined by the compiler as a function of the loop cost, as shown in line of code 432.

A few run-time checks are inserted into the code by the cost-based analysis performed by the compiler at line of code 434. The run-time checks enable conditional parallelization. For example, if the loop cost is above a certain threshold, a parallel run-time routine is invoked to parallelize the loop. If not, the code is executed serially.

In order to invoke the parallel run-time routine to parallelize the loop, the compiler makes a call to the parallel run-time routine, as shown in line of code 436. The compiler passes the address of the outlined routine shown in code 420 to the parallel run-time routine in line of code 436. The parallel run-time routine parallelizes the loop over the selected number of threads in accordance with the aspects of the present invention.

If the run-time checks indicate that the loop cost is not above the threshold, the loop will not be parallelized. For example, if the loop cost is not above a certain threshold, then the ELSE loop shown in code 440 will be invoked to serially execute the loop. In addition, if the selected number of threads is not greater than one, the loop will be executed serially. The run-time checks prevent small loops from being parallelized where parallelization would not be cost-justified.

The ELSE loop shown in code 440 explicitly invokes the outlined routine, as shown in line of code 442. The loop will thereby be executed serially rather than in parallel.

Figures 5, 6:
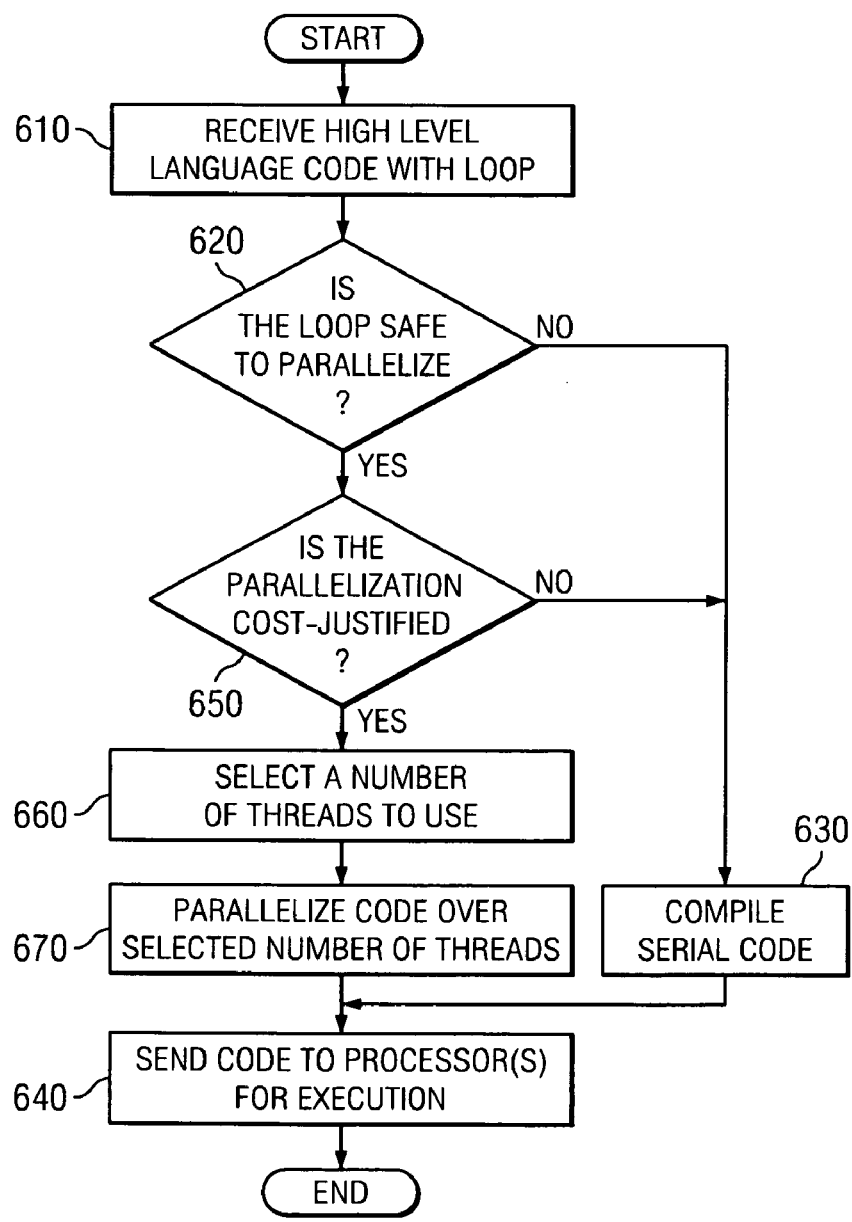
FIG. 5 is an exemplary illustration of an algorithm for determining the number of threads to use to parallelize a loop in accordance with an exemplary embodiment of the present invention.
FIG. 6 is a Flowchart outlining an exemplary operation of an exemplary embodiment of the present invention when a determination of whether to parallelize a loop is made in accordance with that exemplary embodiment of the present invention.

FIG. 5 is an exemplary illustration of an algorithm for determining the number of threads to use to parallelize a loop in accordance with an exemplary embodiment of the present invention. Depending on the iteration count of a particular instance of a loop, the parallel run-time library computes the number of threads to be used to process the parallelized loop. Parallel run-time library 340 in FIG. 3 implements code 510.

As shown in code 510, the number of threads to be used can be determined based on the total number of iterations for the loop divided by the iterations per thread (IPT) parameter. In accordance with the aspects of the present invention, the selected number of threads to be used for processing the loop is initially determined before the first iteration of the loop is executed.

As shown in code 520, if the number of threads to be used for processing the loop is greater than the number of available threads, the number of threads available will be used for processing the loop. In other words, if the number of threads used is greater than the number of threads available, the number of threads used will default to the number of threads available. In this manner, the number of threads used to process a parallelized loop can be restricted based on the iteration count for the loop, the parameter for the loop, and the number of threads available for processing the loop.

FIG. 6 is a flowchart outlining an exemplary operation of an exemplary embodiment of the present invention when a determination of whether to parallelize a loop is made in accordance with that exemplary embodiment of the present invention. The process may be implemented by compiler 320 shown in FIG. 3.

A compiler receives source code including a loop (step 610). The source code is a high level language code. A determination is made as to whether it is safe to parallelize the loop (step 620). If it is not safe to parallelize the loop, the compiler compiles the serial code for sequential processing (step 630). The compiler sends the compiled serial code to a processor for execution (step 640), with the process terminating thereafter. Serial code is defined as un-parallelized executable code that will be sequentially executed by a single processor.

Returning now to step 620, if the loop is safe for parallelization, the compiler performs a cost-based analysis to determine whether parallelization of the loop is cost-justified (step 650). Parallelization is typically more beneficial with regard to large loops than small loops. For example, a small loop may execute less efficiently in parallel than if it were executed serially due to the overhead costs of starting and synchronizing parallel tasks. A loop cost may be determined based on the iteration count for the loop and the estimated execution time for the loop body. If a determination is made that the parallelization is not cost-justified, the compiler compiles the serial code (step 630). The compiler sends compiled serial code to a processor for sequential execution (step 640), with the process terminating thereafter.

Returning now to step 650, if a determination is made that parallelization of the loop is cost-justified, a determination will be made as to the number of threads to be used to process the parallelized loop (step 660). The number of threads to be used to process iterations of the loop is selected from a plurality of available threads. Thus, in accordance with an aspect of the present invention, all available threads are not automatically selected for processing a parallelized loop. Instead, a selected number of threads from the plurality of available threads are chosen to process iterations of the loop.

The code is parallelized for processing over the selected number of threads (step 670) in the plurality of threads available. The parallelized code is sent to one or more processors for execution (step 640), with the process terminating thereafter.

In accordance with another embodiment of the present invention, a user may specify a default number of threads for processing a given instance of a parallelized loop. If a number of threads is not selected, the default number of threads can be used to parallelize the loop.

Figure 7:
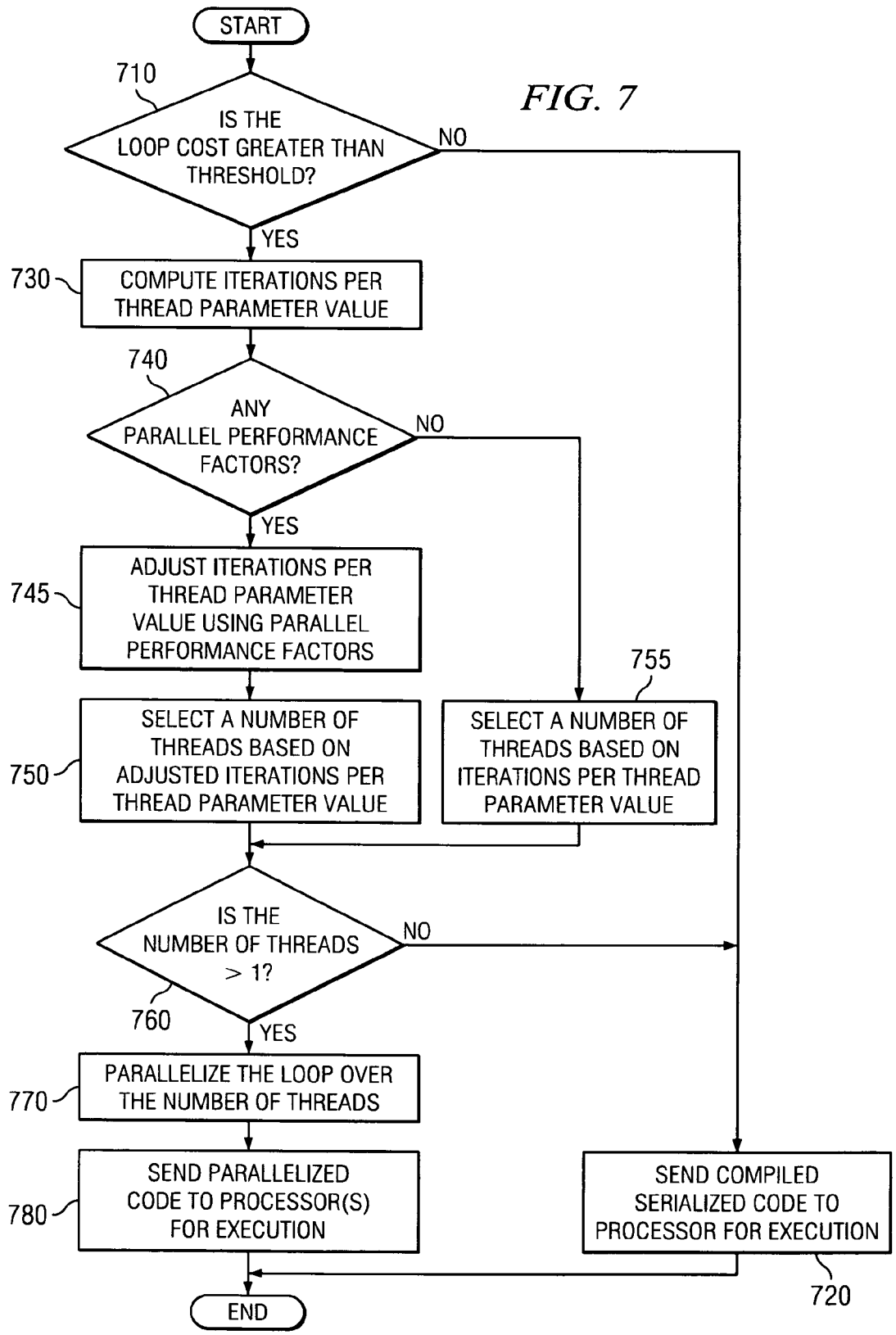
FIG. 7 is a flowchart outlining the operation of an exemplary embodiment of the present invention for determining a number of threads to use for parallelizing a loop in accordance with an exemplary embodiment of the present invention.

FIG. 7 is a flowchart outlining the operation of an exemplary embodiment of the present invention for determining a number of threads to use for parallelizing a loop. The process in steps 730-780 is a more detailed description of step 660 in FIG. 6 for selecting a number of threads to use for parallelizing a loop. The process depicted in FIG. 7 is implemented by compiler 320 shown in FIG. 3.

A determination is made as to whether the cost of the loop is greater than a threshold value (step 710). If a determination is made that the loop cost is not greater than the threshold, then the source code is compiled serially and sent to a processor for sequential execution (step 720), with the process terminating thereafter. However, if the loop cost is greater than the threshold, a parameter specifying a minimum number of iterations per thread is calculated (step 730).

A determination is then made as to whether any parallel performance factors are available (step 740). If parallel performance factors are available, the parameter is adjusted using one or more parallel performance factors (step 745) to form an adjusted parameter. A selection of a number of threads to use to process the parallelized loop is made based on the adjusted iterations per thread parameter (step 750).

Returning to step 740, if no parallel performance factors are available, the process selects a number of threads to use to process the parallelized loop based on the value for the unadjusted iterations per thread parameter (step 755).

A determination is made as to whether the selected number of threads is greater than one (step 760). If the selected number of threads is not greater than one, the serial code is compiled and sent to a processor for sequential execution (step 720), with the process terminating thereafter.

If the selected number of threads is greater than one, the loop is parallelized over the selected number of threads (step 770). The parallelized code is sent to one or more processors for execution in parallel (step 780), with the process terminating thereafter.

The aspects of the present invention may improve performance and scalability of parallelization by facilitating the implementation of parallelization in a controlled manner based on the size of the loop. The number of threads to use for parallelization of a loop is determined at a loop level granularity.

The flowchart and block diagrams in the figures illustrate the architecture, functionality, and operation of some possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for restricting how many threads are used for parallelizing a loop by a computer, the computer implemented method comprising:

identifying, by the computer, a parameter used to limit parallelization of the loop, wherein the parameter specifies a minimum number of loop iterations that a thread should execute and is independent and different in value from a loop iteration count for the loop, wherein the parameter is calculated based on a function of a loop cost for the loop; and selecting, by the computer, a number of threads from a plurality of available threads for processing iterations of the loop based on the parameter, wherein the number of threads is selected prior to execution of a first iteration of the loop and the number of threads selected is less than the plurality of available threads.

2. The computer implemented method of claim 1 further comprising:
prior to selecting the number of threads, adjusting the parameter based on at least one parallel performance factor, wherein each at least one parallel performance factor is a factor that influences a performance of a parallel code.

3. The computer implemented method of claim 1 wherein the loop cost for the loop is based on an estimated size of a loop body of the loop and a number of iterations through which the loop will execute, and wherein the number of threads is determined by dividing the loop iteration count by the parameter.

4. The computer implemented method of claim 3 further comprising:
a compiler generating intermediate code for the loop from source code for the loop; and
the compiler parallelizing the loop over the selected number of threads, wherein the compiler performs the identifying and selected steps, and wherein the parameter is adjusted after the compiler generates the intermediate code for the loop from the source code for the loop.

5. The computer implemented method of claim 4 further comprising:
determining whether the loop cost is greater than a threshold; and
responsive to determining that parallelization of the loop is cost-justified, passing the parameter to a parallel run-time routine to parallelize the loop.

6. The computer implemented method of claim 1, wherein a value of the parameter is a user defined value.

7. The computer implemented method of claim 1 further comprising:
after executing at least one iteration of the loop, selecting an adjusted number of threads for processing iterations of the loop based on a run-time adjusted value of the parameter.

8. The computer implemented method of claim 2 wherein the at least one parallel performance factor includes a cache access pattern, a run-time profile, or a user defined factor.

9. The computer implemented method of claim 5 further comprising:
the intermediate code calculating the parameter and calling the parallel run-time routine to parallelize the loop using the parameter.

10. A computer program product comprising:
a computer usable storage medium having computer usable program code stored thereon for restricting how many threads are used for parallelizing a loop, said computer program product including:
computer usable program code for identifying a parameter used to limit parallelization of the loop, wherein the parameter specifies a minimum number of loop iterations that a thread should execute and is independent and different in value from a loop iteration count for the loop, wherein the parameter is calculated based on a function of a loop cost for the loop; and
computer usable program code for selecting a number of threads from a plurality of available threads for processing iterations of the loop based on the parameter, wherein the number of threads is selected prior to execution of a first iteration of the loop and the number of threads selected is less than the plurality of available threads.

11. The computer program product of claim 10 wherein the loop cost for the loop is based on an estimated size of a loop body of the loop and a number of iterations through which the loop will execute, and wherein the number of threads is determined by dividing the loop iteration count by the parameter.

12. The computer program product of claim 10 further comprising:
computer usable program code for adjusting the parameter based on at least one parallel performance factor prior to selecting the number of threads, wherein each at least one parallel performance factor is a factor that influences a performance of a parallel code.

13. The computer program product of claim 11 further comprising:
computer usable program code for generating intermediate code for the loop from source code for the loop; and
computer usable program code for parallelizing the loop over the selected number of threads, wherein the parameter is adjusted after generating the intermediate code for the loop from the source code for the loop.

14. The computer program product of claim 10 further comprising:
computer usable program code for generating intermediate code for the loop from source code for the loop; and
the intermediate code calculating the parameter and calling a parallel run-time routine to parallelize the loop using the parameter.

15. The computer program product of claim 11 further comprising:
computer usable program code for determining whether the loop cost is greater than a threshold; and
computer usable code, responsive to determining that parallelization of the loop is cost-justified, for passing the parameter to a parallel run-time library to parallelize the loop.

16. A system for restricting how many threads are used for parallelizing a loop, comprising:
a storage device coupled to a bus, wherein the storage device contains a computer usable program product;
a communications unit coupled to the bus; and
a processor unit coupled to the bus, wherein the processor unit executes a computer usable program code to identify a parameter used to limit parallelization of the loop, wherein the parameter specifies a minimum number of loop iterations that a thread should execute and is independent and different in value from a loop iteration count for the loop, wherein the parameter is calculated based on a function of a loop cost for the loop; and selects a number of threads from a plurality of available threads for processing iterations of the loop based on the parameter, wherein the number of threads is selected prior to execution of a first iteration of the loop and the number of threads selected is less than the plurality of available threads.

17. The system of claim 16 wherein the loop cost for the loop is based on an estimated size of a loop body of the loop and a number of iterations through which the loop will execute, and wherein the number of threads is determined by dividing the loop iteration count by the parameter.

18. The system of claim 16, wherein the processor executes computer-usable program code to adjust the parameter based on at least one parallel performance factor prior to selecting the number of threads, wherein each at least one parallel performance factor is a factor that influences a performance of a parallel code.

19. The system of claim 16 further comprising:
a compiler generating intermediate code for the loop from source code for the loop; and
the intermediate code calculating the parameter and calling a parallel run-time routine to parallelize the loop using the parameter.

20. A computer implemented method for restricting how many threads are used for parallelizing a loop by a computer, the computer implemented method comprising:
identifying, by the computer, a parameter used to limit parallelization of the loop, wherein the parameter specifies a minimum number of loop iterations that a thread should execute and is independent and different in value from a loop iteration count for the loop, wherein the parameter is calculated based on a function of a loop cost for the loop;
adjusting, by the computer, the parameter based on at least one parallel performance factor to form an adjusted parameter, wherein each at least one parallel performance factor is a factor that influences a performance of a parallel code, and wherein the parameter is adjusted prior to execution of a first iteration of the loop to form an adjusted parameter;
selecting, by the computer, a number of threads from a plurality of available threads for processing iterations of the loop based on the adjusted parameter, wherein the number of threads selected is less than the plurality of available threads; and
parallelizing, by the computer, the loop over the selected number of threads.

* * * * *